Aug. 23, 1927.
A. L. KRONQUEST
CAN TESTING MACHINE
Filed March 15, 1923
1,640,242
9 Sheets-Sheet 1
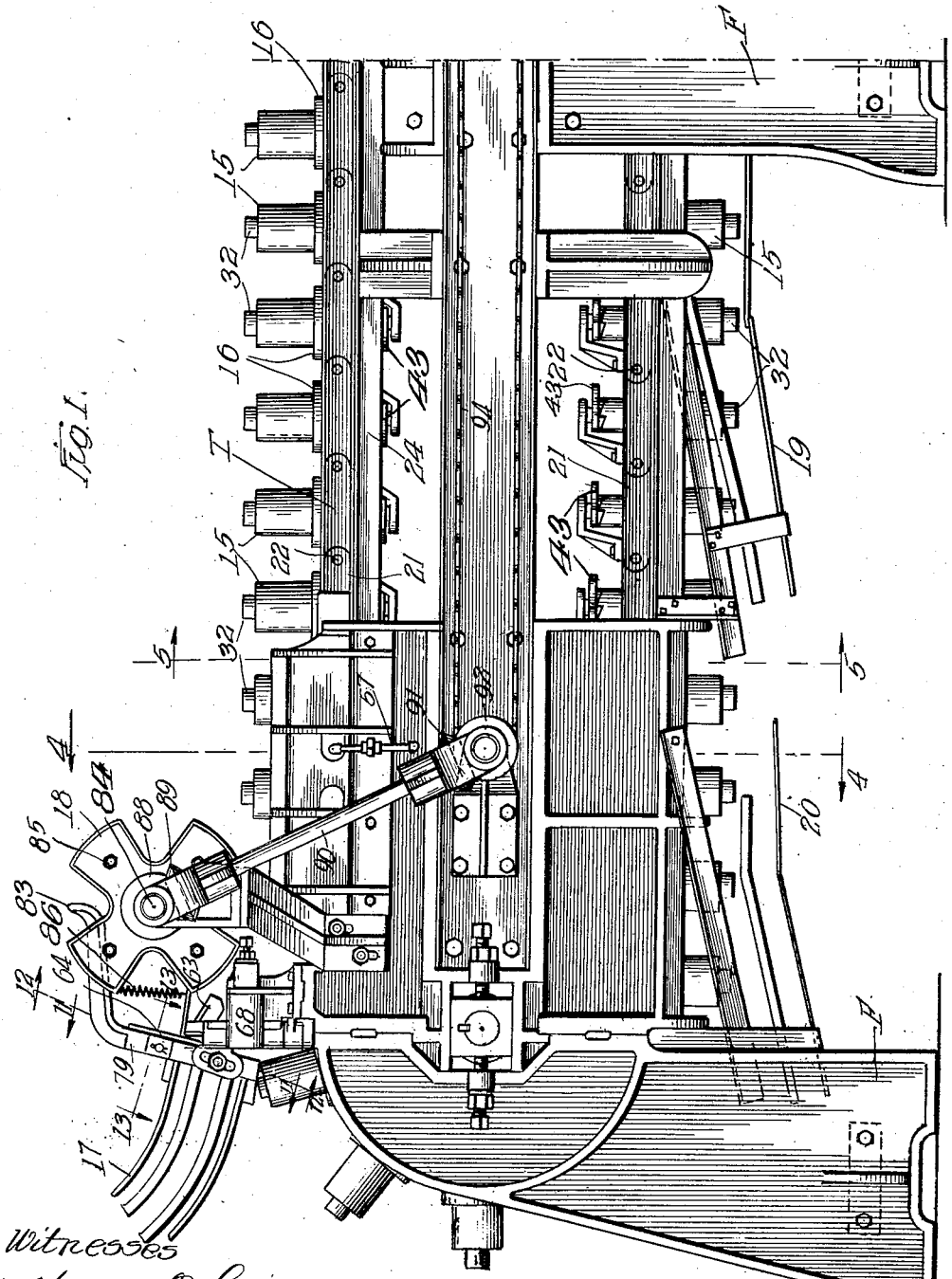

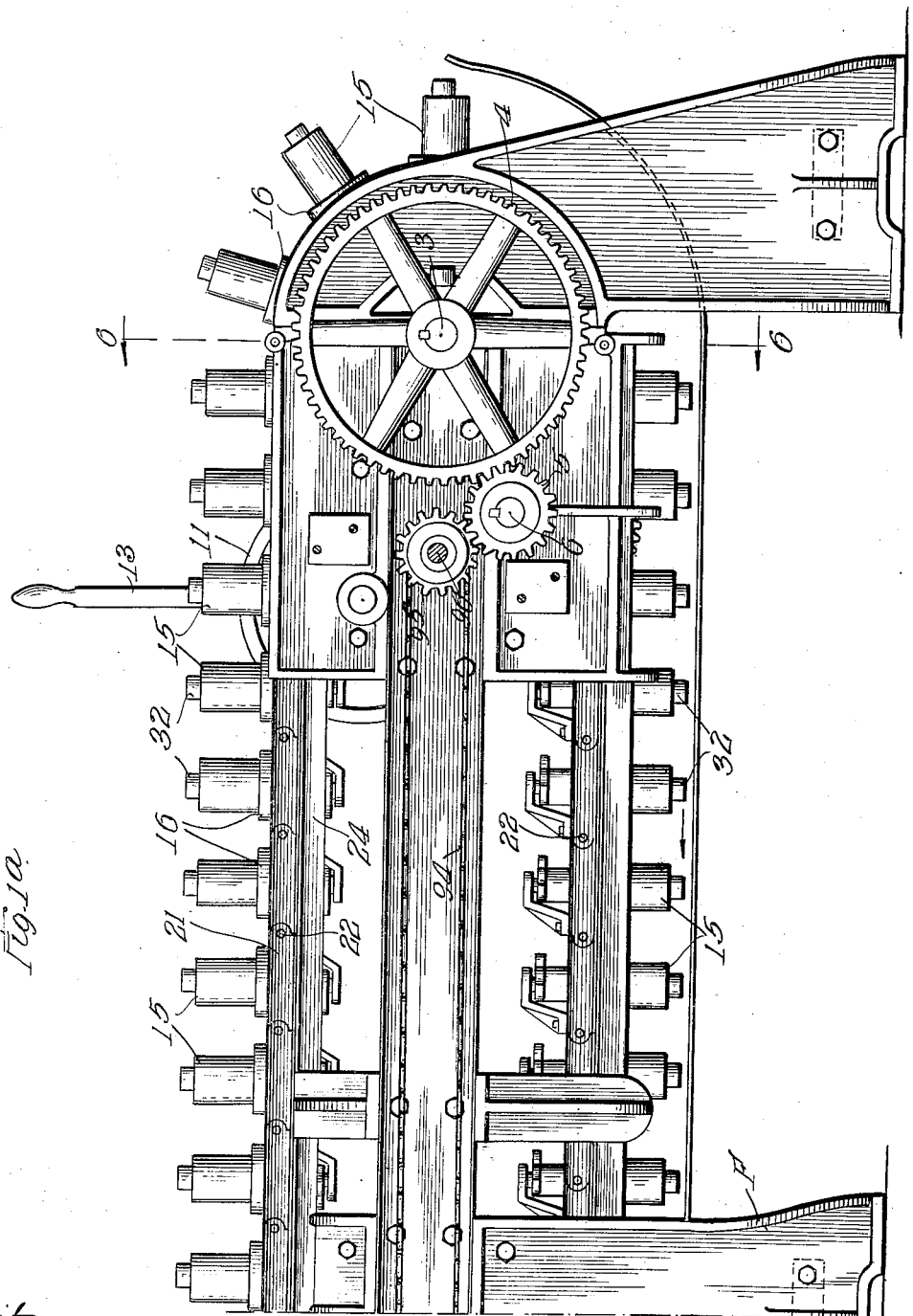

Aug. 23, 1927.
A. L. KRONQUEST
1,640,242
CAN TESTING MACHINE
Filed March 15, 1923
9 Sheets-Sheet 3
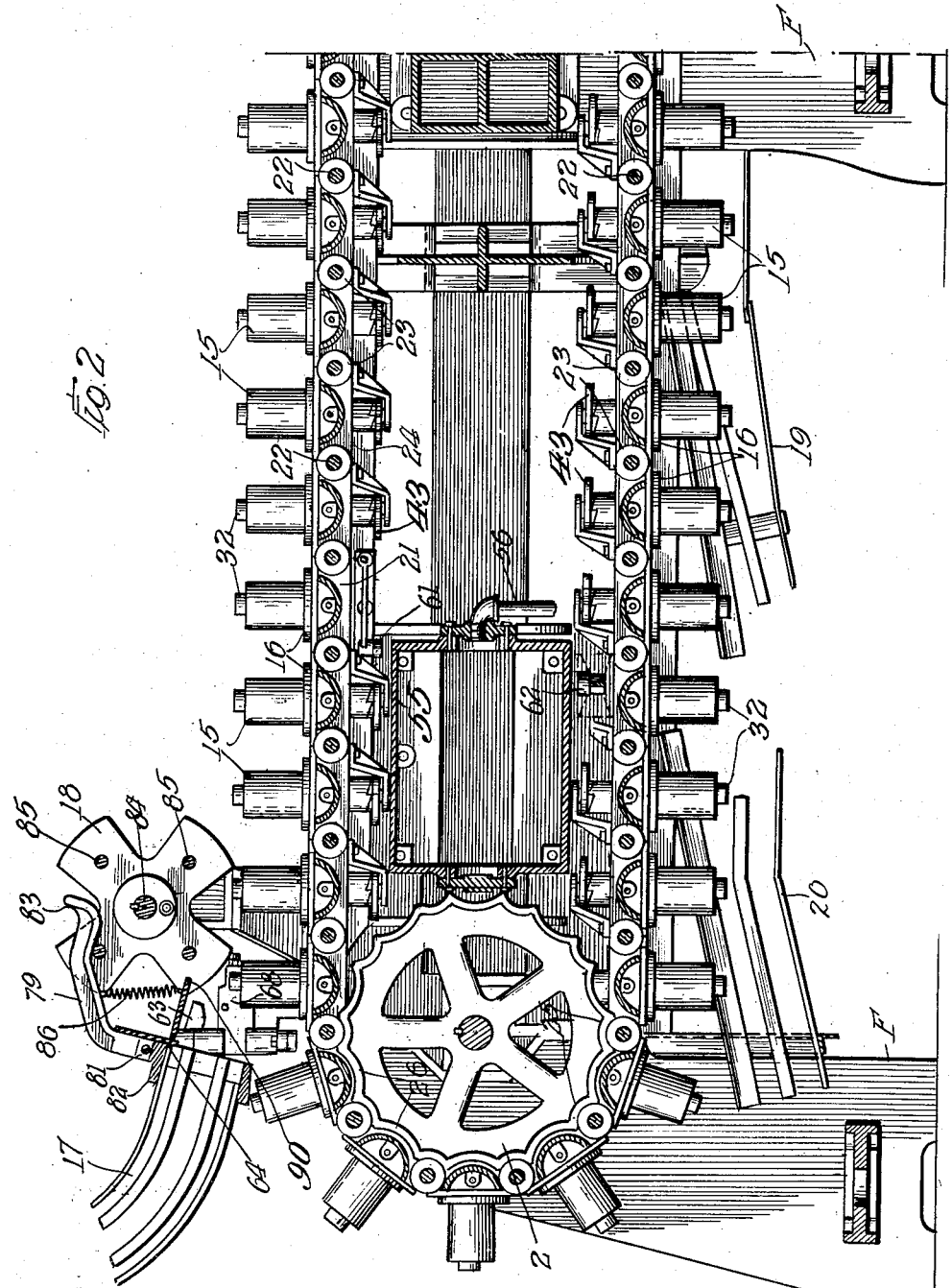

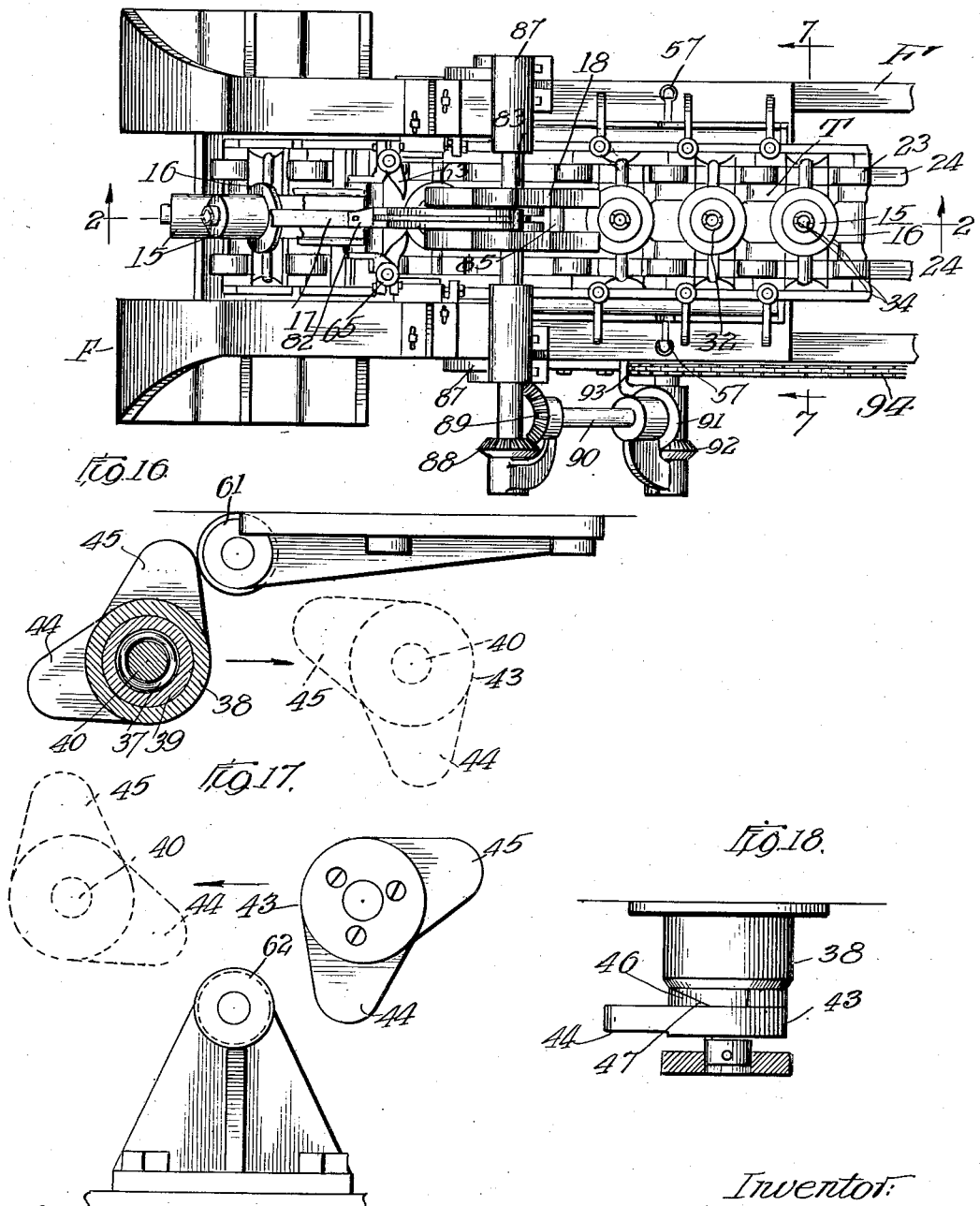

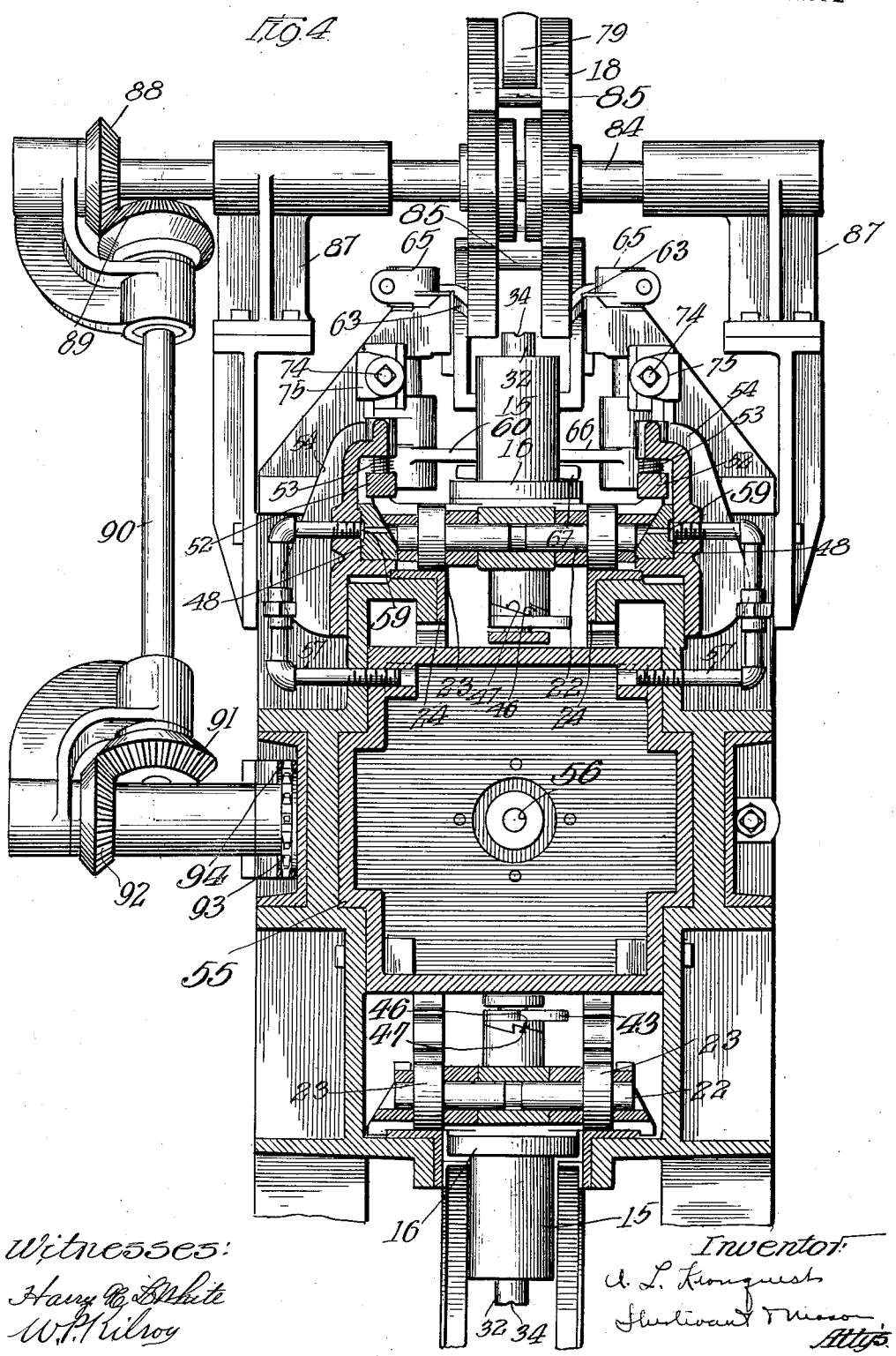

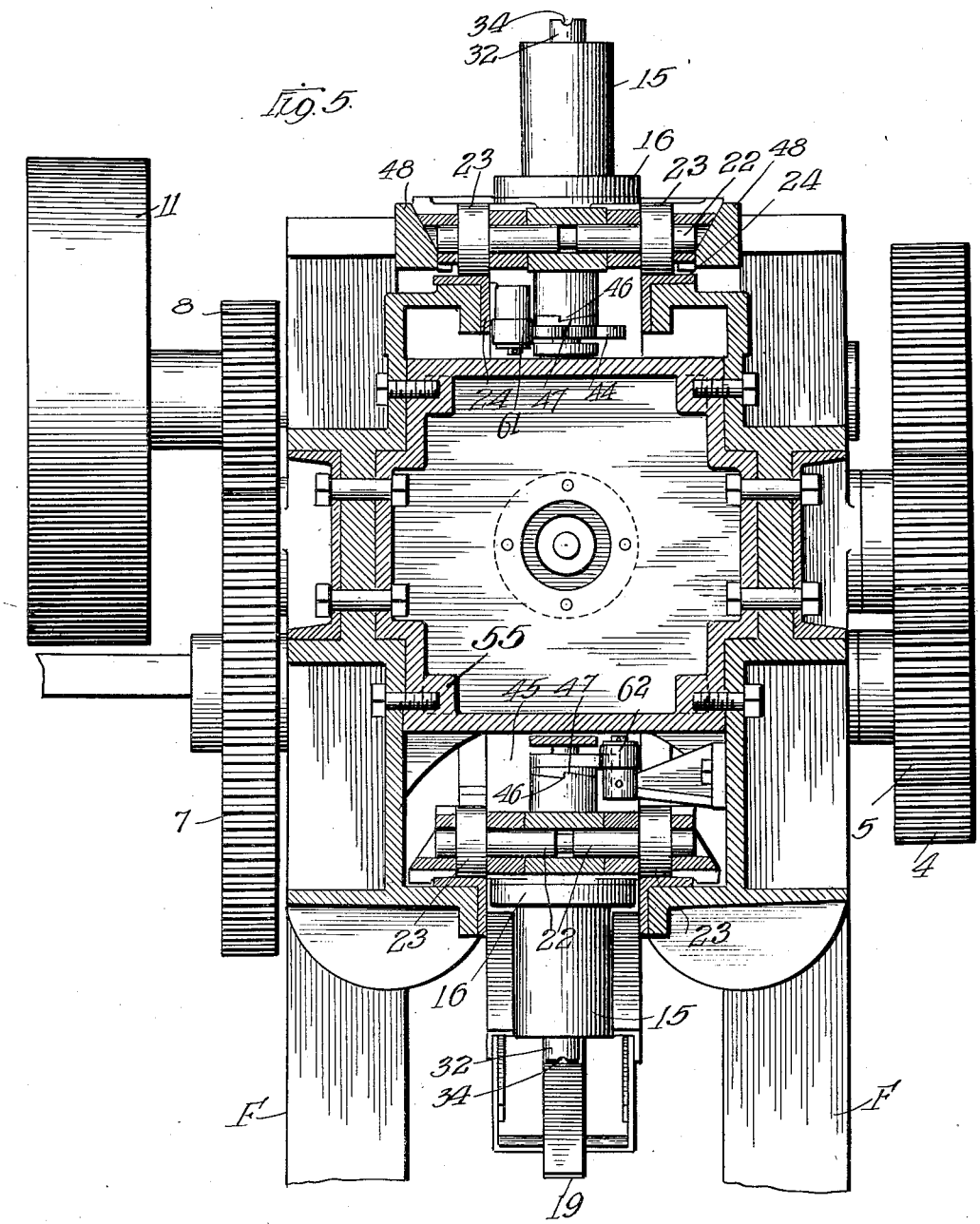

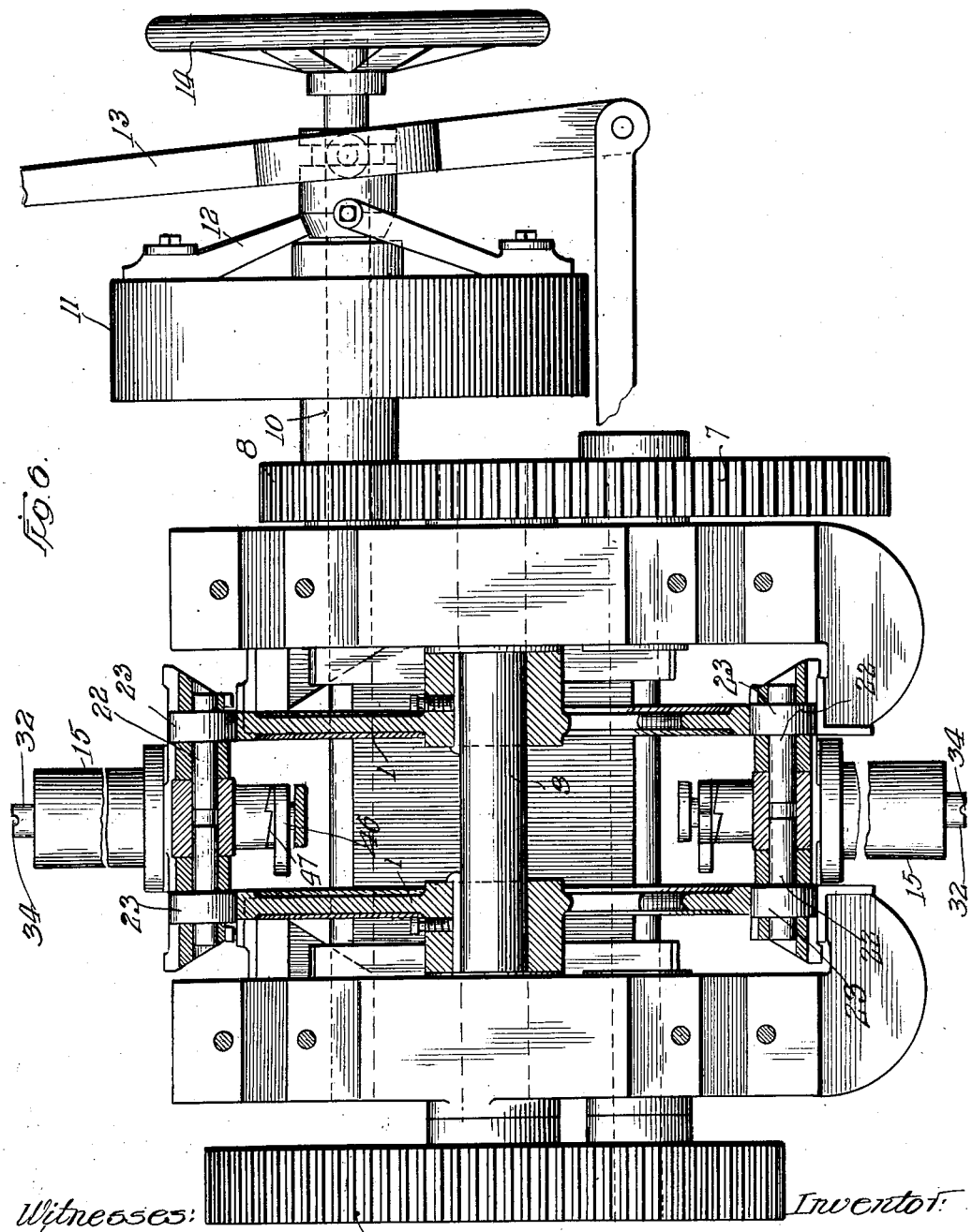

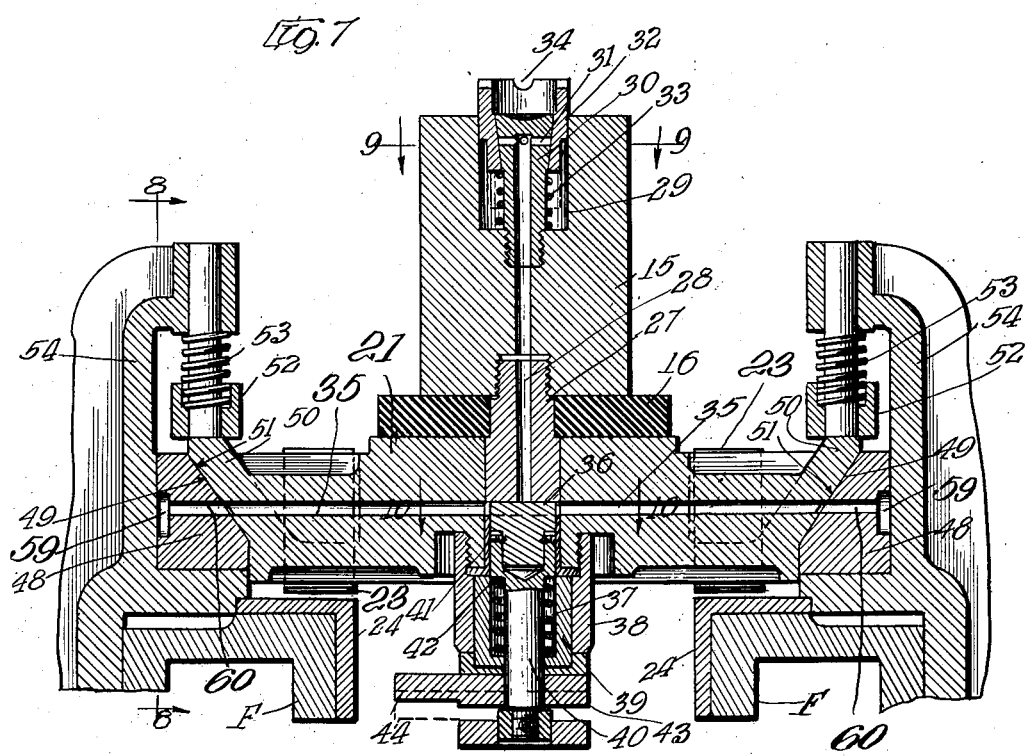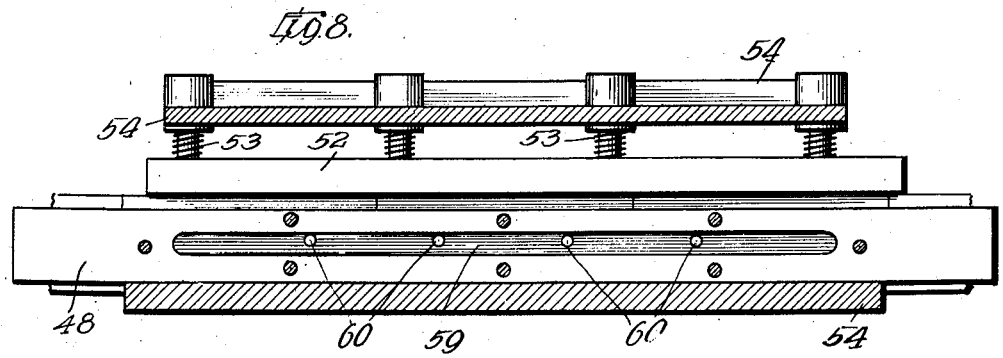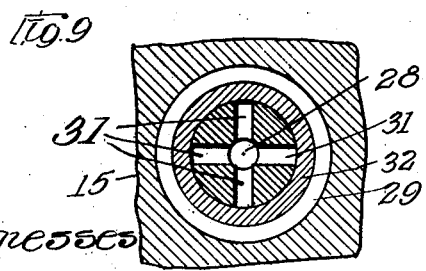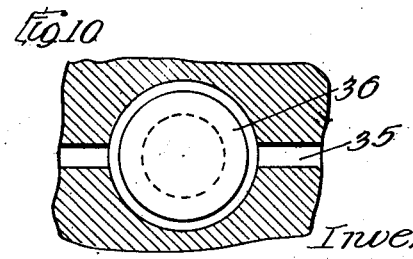

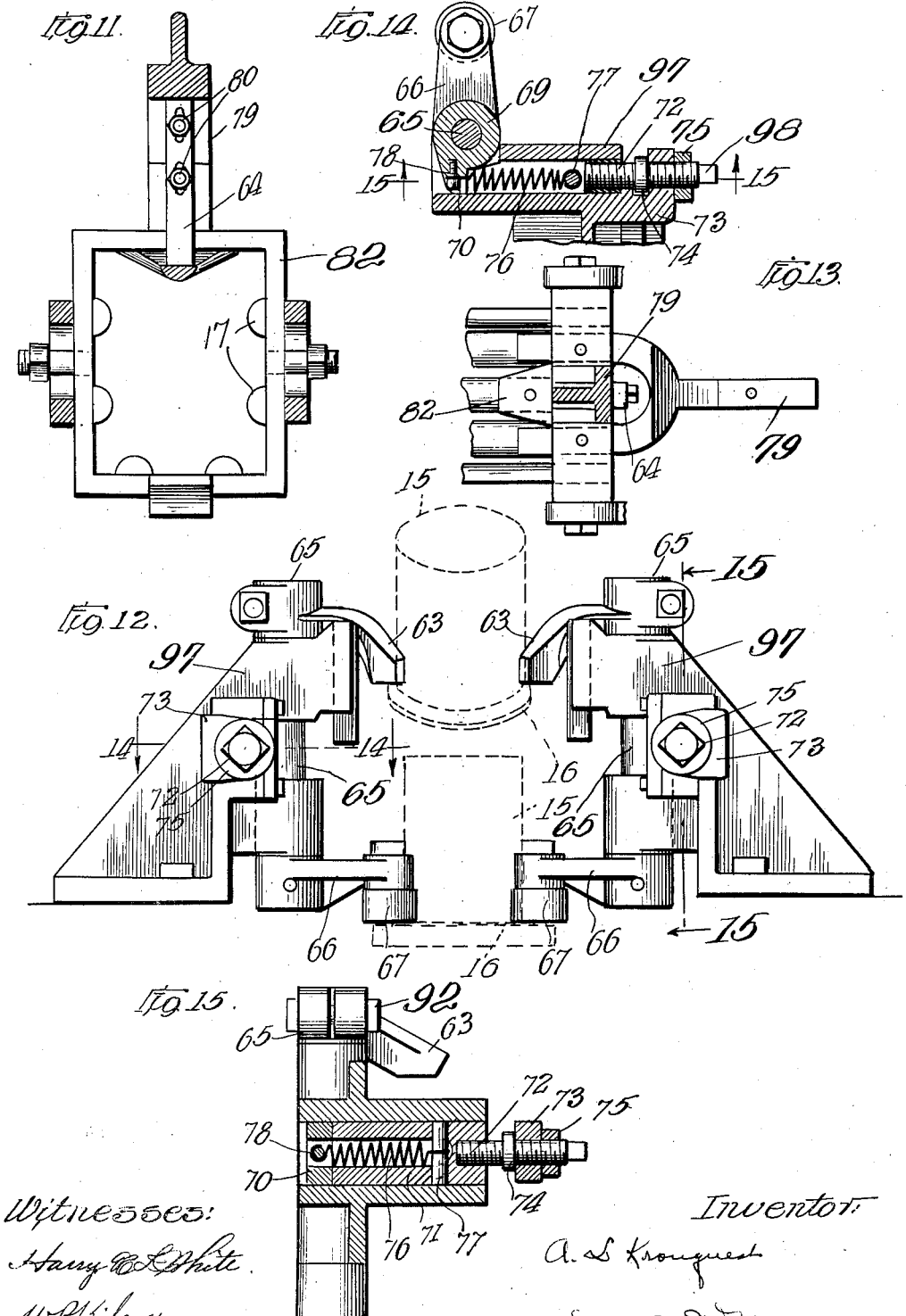

Patented Aug. 23, 1927.

1,640,242

UNITED STATES PATENT OFFICE.

ALFRED L. KRONQUEST, OF CHICAGO, ILLINOIS, ASSIGNOR TO CONTINENTAL CAN COMPANY, OF SYRACUSE, NEW YORK, A CORPORATION OF NEW YORK.

CAN-TESTING MACHINE.

Application filed March 15, 1923. Serial No. 625,301.

The invention relates to new and useful improvements in can testing machines for determining whether or not the seams joining the parts of the can are airtight.

An object of the invention is to provide a testing machine wherein the cans are tested by means of a vacuum created within the cans while the cans are traveling through the machine, which vacuum is utilized for supporting the cans so that in case of any leak in any one of the seams, the vacuum will be decreased or destroyed, and thus cause the can with the leak to drop from its support and pass out of the machine over a different runway from those cans wherein the seams are tight and a can is not dropped until it is released automatically by the machine.

A further object of the invention is to provide a machine of the above type with a series of horns which extend into the cans one after another, and occupy a large portion of the interior area of the can whereby the vacuum area in the can is reduced and thus more easily modified or disturbed by a slow leak.

A further object of the invention is to provide a machine of the above type with means controlled by the cans to be tested for closing the vacuum port associated with each horn until a can is placed over the horn.

A still further object of the invention is to provide means for assisting gravity in discharging the cans from the machine, provided the supporting vacuum in the can decreases to a predetermined point.

A further object of the invention is to provide a machine of the above type with an endless series of chucks for carrying the cans through a region wherein the cans are put under vacuum with means for closing the vacuum drawing port for the chucks prior to the chucks leaving the vacuum creating region, whereby the vacuum in the can is maintained unless the can has a leak.

A still further object of the invention is to provide a machine of the above type with means for causing the cans to travel open end down while passing through the vacuum drawing region and for later inverting the cans whereby each can is supported solely through the vacuum created in the can so that the leak in the can reducing the vacuum will release the can so that it may drop by gravity from the machine.

These and other objects will in part be obvious and will in part be hereinafter more fully disclosed.

In the drawings which show by way of illustration one embodiment of the invention—

Figure 1 is a side view of one half of the machine;

Fig. 1ª is a side view of the remaining half of the machine;

Fig. 2 is an enlarged vertical sectional view centrally through the forward portion of the machine;

Fig. 3 is a top plan view of the forward end of the machine;

Fig. 4 is a sectional view on the line 4—4 of Fig. 1;

Fig. 5 is a sectional view on the line 5—5 of Fig. 1;

Fig. 6 is a sectional view on the line 6—6 of Fig. 1ª;

Fig. 7 is a sectional view on the line 7—7 of Fig. 3;

Fig. 8 is a sectional view on the line 8—8 of Fig. 7;

Fig. 9 is a sectional view on the line 9—9 of Fig. 7;

Fig. 10 is a sectional view on the line 10—10 of Fig. 7;

Fig. 11 is a sectional view on the line 11—11 of Fig. 1;

Fig. 12 is a sectional view on the line 12—12 of Fig. 1, but looking in the opposite direction from that of Fig. 11;

Fig. 13 is a sectional view on the line 13—13 of Fig. 1;

Fig. 14 is a sectional view on the line 14—14 of Fig. 12;

Fig. 15 is a sectional view on the line 15—15 of Fig. 14;

Fig. 16 is a view partly in section and partly in plan showing the roller for engaging and releasing the valve which closes the ports connecting the vacuum creating means with the can to be placed under vacuum, said figure showing in broken lines the valve turned by said roller;

Fig. 17 is a plan view showing the roller which operates upon the valve to close the port and hold the vacuum in the can for testing the same, and Fig. 18 is a detail partly in section and partly in side elevation showing the means for raising and lowering said vacuum controlling valve.

The invention in its broadest aspect comprises a supporting frame on which a series of trucks or carriages is mounted. These trucks move continuously and travel in a vertical plane moving first through the machine on an upper horizontal level and then inverting and returning on a lower horizontal level.

Each truck has a horn projecting therefrom over which the can to be tested is placed with the open end downward and resting on an elastic pad preferably of rubber, which surrounds the horn. The purpose of this elastic pad is to form an airtight closure for the can. The cans are fed one at a time on to the traveling horns and the feed of the cans is controlled by the traveling trucks so that as a truck passes the end of the can feed chute, a can is released and drops over the horn. Means are provided for positively forcing the cans down on to the elastic pads and thus seating the same ready for testing. In each horn there is a vacuum drawing port and this port is normally closed by a yieldingly supported member projecting outwardly from the end of the horn. When the can is placed over the horn and forced downwardly on to the elastic pad, the yielding member is also forced downwardly, which opens the vacuum drawing port and connects the same with the interior of the can. The purpose of this yieldingly supported member is to hold the vacuum drawing ports closed, provided there are no cans in the machine to be tested. The purpose of the horns is to displace or fill a greater portion of the area of the interior of the can, so that a relatively small portion remains to be put under vacuum, and therefore, the small leak will very much more readily modify or disturb the vacuum in the can. Each truck has a valve for closing the vacuum drawing port leading to the cans. Along the frame for a portion of the upper travel of the trucks there is a vacuum creating region. The trucks are provided with rollers on which they rest during a greater portion of their travel, but while passing the vacuum creating region, the trucks directly engage supporting rails provided therefor and constructed so as to secure a substantially airtight support. Yielding means is provided for forcing the trucks against these supporting rails. Prior to the trucks reaching the vacuum creating region, the valves carried thereby are turned so as to open the vacuum drawing port in the horn to the vacuum creating means in said vacuum creating region. By this means, the cans over the horns are placed under vacuum. Just before the trucks leave the vacuum creating region, these valves are closed. The cans then travel for some distance in an upright position so that a slow leak will have time to disturb or modify the vacuum in the can, after which the trucks pass to the lower horizontal level, which inverts the trucks, so that the cans are supported entirely through the vacuum within the cans. If there has been a leak, the can will drop from the horn. The yielding members will aid the cans in dropping from the horns. The cans which have no leaks will be carried to a point where the valve is released, thus opening the can to the atmosphere and the cans will drop from the horns. Those cans with leaks will pass into one runway and those cans which drop later and which have no leaks will pass into another runway.

Referring more in detail to the drawings, the machine will be described under the following general headings—General structure; Truck structure; Can feeding mechanism; and Vacuum creating mechanism.

General structure.

The testing machine as disclosed in the drawings consists of a general frame F mounted on suitable standards, and traveling on said frame is an endless series of trucks T. These trucks run along suitable tracks provided therefor. The trucks engage a pair of supporting wheels 1, 1, at one end of the machine and a pair of supporting wheels 2, 2 at the other end of the machine. The supporting wheels 1, 1 are mounted on a shaft 3 which extends beyond the sides of the frame and carries a gear wheel 4. A pinion 5 meshes with the gear wheel 4 and the pinion 5 is carried by a shaft 6 mounted in suitable bearings in the frame of the machine. On the other end of the shaft 6 there is a gear wheel 7 which meshes with a gear wheel 8 on the main shaft 10. Mounted on the main shaft 10 is a belt wheel 11 which is connected to the main shaft by suitable clutch mechanism 12 operated by a hand lever 13. The main shaft may be turned when released from the belt pulley by means of a hand wheel 14.

Mounted on each truck is a horn 15 over which the cans are placed, open end down, and adjacent the bottom of the horn is an elastic pad 16 with which the can may make air-tight connection. The cans are fed one at a time on to these horns from a feed chute 17. Suitable releasing mechanism operated by the machine releases the cans so that they drop one at a time over the horns, and a rotating depresser 18 forces the cans down on to the elastic pads. The cans, after they are seated on the elastic pads pass through a region where they are subjected to vacuum. After the can is placed under vacuum, a port leading through the horn to the can is closed and the can will remain under vacuum until said valve is released unless there is a leak in the can which permits air to enter the can. As the trucks travel they are inverted and pass back along the lower horizontal level, and when so inverted, the cans are supported solely by the vacuum created therein. If this vacuum is destroyed or decreased below a certain point, then the cans will fall from the horns and thus it is determined that the can contains a leak. Those which fall from the horn by reason of a leak pass into the runway 19, while those that are sustained by the horns until the valves are turned to release the cans pass into the runways 20.

*Truck structure.*

Each truck consists of a base portion 21, and these base portions are nicely fitted together at their meeting sides. Said trucks are provided with suitably projecting perforated parts through which a pivot pin 22 passes for pivoting the truck sections together. On these pivot pins are rollers 23, 23, one at each end of the pivot pin, and it is understood that there are pivot pins between the adjacent sides of the trucks, and therefore, there are four rollers for each truck, two of the rollers being common to adjacent trucks. These rollers, when the cans are passing through the upper horizontal level, will roll along guide rails or tracks 24, preferably formed of angle bars mounted on the frame F of the machine. At the ends of the frame, the rollers of the trucks engage suitable segmental recesses 25 formed in the supporting wheels 1, 1, and 2, 2. Intermediate the segmental recesses 25 there are segmental recesses 26 for the base portion of the truck. This forms a structure whereby the endless series of trucks is well supported, and it is positively driven when the supporting wheels 1, 1 are rotated.

Each truck is provided with a central standard 27 which is threaded at its upper end. The pad 16 is formed with an opening which surrounds this standard, and the horn is provided with a threaded opening which screws on to the threaded end of the standard, thus it is that the pad is firmly clamped against the base of the truck. There is a vacuum creating port or passage 28 which extends up through the standard 27 and through the horn 15. In the upper end of the horn there is a recess 29. At the bottom of said recess is a smaller extension of the recess which is threaded to receive a stem 30. This stem 30 has a passage or port which is in line with the port or passage 28. There are four cross ports 31 connecting with this central port 28 leading up through the stem 30. The stem 30 at its upper end is tapered with the base or large end thereof at the upper end of the stem. Surrounding said stem is a sleeve 32 which is normally forced upward by means of a spring 33 bearing against the lower end of the sleeve and against the bottom face of the recess 29. This spring normally lifts the sleeve so as to bring the inner tapered surface thereof into air-tight contact with the upper tapered surface of the stem 30. When, however, the sleeve is depressed, then the ports 31 are uncovered so that air may be drawn in through said ports to create a vacuum in the can. The upper edge of the sleeve 32 is provided with notches 34 so that when a can is placed down over the stem, and pressed down into seating contact with the pad, said can will force this sleeve downwardly, releasing the ports in the stem 30 and the notches 34 insure free communication with the interior of the can. This provides a means whereby the vacuum creating port is closed to the atmosphere unless the can is placed over the horn and forced down on to the horn so as to depress the sleeve 32.

These is a cross port or passage 35 running through the base of the truck and communicating with a recess directly beneath the standard 27. A cylindrical valve 36 located in the recess is normally raised by means of a spring 37 so as to bear against the under face of the standard 27 and close the port 28 as well as the port 35. Secured to the under face of the base of the truck, is a depending sleeve 38. Within this sleeve is a cup 39, and the spring 37 is housed within the cup, bearing against the inner face of the cup. Secured to the valve 36 is a depending stem 40 which extends through an opening in the cup and the sleeve 38. This stem 40 has a recess in its upper end to receive a stem on the valve and suitable set screws 41 couple the stem 40 to the valve 36. The stem 40 is reduced to receive the spring and provide a shoulder 42 against which the spring bears. Thus it is that the spring normally forces the valve upwardly so as to close the ports. On the lower end of the stem there is a lever 43 provided with two arms 44 and 45 disposed substantially at right angles to each other. On the upper face of the lever are inclined ledges 46 which are adapted to cooperate with inclined ledges 47 on the lower end of the sleeve 38. It will readily be seen from Figures 16 to 18, that when this lever is turned in one direction, one incline running up the other will force the stem 40 downwardly and thus open the valve 36 so as to permit free communication between the ports 35 and the port 28. It will readily be understood that the lever 43 travels with the trucks, and cam rollers are provided for engaging said lever to turn it first in one direction and then the other for opening and closing said valve. While the trucks are normally supported by the rollers, there is a section along the frame wherein the cans are subjected to a vacuum creating means while the trucks are traveling, and in order to make an air-tight connection between the traveling truck and the frame at this time, I have provided tracks 48 having inclined faces 49, one at each side of the frame. The truck is provided with an upstanding member 50 which has an inclined face 51 shaped to conform to the inclined face 49. When the trucks approach the vacuum creating region, they run up on to these tracks 48 and are supported wholly thereby. Shoes 52 pressed downwardly by a series of springs 53, one at each side of the machine, bear down the respective members 50 and force the truck down into airtight connection with the supporting track 48. These shoes are carried by suitable brackets 54 mounted on the frame of the machine.

Vacuum-creating means.

Located beneath the upper run of the endless trucks and in the frame of the machine is a vacuum tank 55. Said vacuum tank is placed under vacuum by a suitable pipe connection 56 with any desired form of vacuum creating means. Pipes 57, 57 are connected with the vacuum tank at their lower ends and at their upper ends extend through the brackets 54, opening at the inner face of said brackets. The tracks 48 are provided with an elongated recess 59, and the pipes 57 at the opposite sides of the machine are connected with these elongated recesses in the respective track sections. At intervals along the track 48 there are openings 60 which extend through to the inner face of the track. The passages or ports 35 extend through to the outer face of the sides of the trucks, and as a consequence, as the trucks move along, these passages or ports 35 will be brought into register with the openings 60, and thus it is that the central port 28 extending up through the horn is connected up to the vacuum tank when the valve 36 is moved downwardly so as to connect said port 28 with the ports 35. The valves are normally open as they approach the vacuum creating region. The port 28, however, is closed by the sleeve 32 when in raised position, that is, when there is no can over the horn. As soon however, as a can is placed over the horn and pressed down on to the elastic pad, then the ports controlled by the sleeve 32 are opened, and this establishes a free connection between the ports or passages 35 in the base of the truck and the interior of the can. As the trucks move forward, the ports or passages 35 will be brought opposite the openings 60 and thus the vacuum tank connected up with the can and a vacuum is created in the can. After a suitable vacuum has been created in the can, then the lever 43 engages a cam roller 61 and this cam roller 61 striking the arm 45 will turn the lever to the dotted line position in Fig. 17, which releases the valve 36 so that the spring will force the same upwardly and close the port 28. This will close all entrance of air through the port or passage 28 to the can. If, however, there is a slow leak in the can, then air will enter through the leak and reduce or destroy the vacuum. When the truck reaches the end of the machine, it passes around the wheels 1, 1 and is thus inverted. As the truck moves along the lower horizontal level, the can is supported entirely by the vacuum created therein, and if the leak is sufficient to reduce the vacuum or destroy it, the can will drop from the horn and into the runway 19 soon after the can is inverted. The spring pressing on the sleeve 32 aids in this forcing of the can off from the horn when the vacuum is reduced. The horns fill a greater portion of the interior of the cans and therefore, there is a comparatively small part of the can to be placed under vacuum. Inasmuch as the area placed under vacuum is relatively small, this area of vacuum will be modified or reduced very quickly by a relatively slow leak.

If there is no leak in the can, it remains on the horn until the lever 43 strikes the cam roller 62. It is the arm 44 that now engages the cam roller as shown in Fig. 17, and the lever will be turned in the opposite direction pulling down on the valve 36 and opening the passage 28 to the atmosphere, so that air may rush in therethrough and destroy the vacuum in the can so that it drops from the machine into the runway 20.

Can-feeding mechanism.

The cans to be tested are led into the machine from a suitable runway 17. At the lower end of this runway there is a swinging finger 64 which engages the top of the lowermost can in the runway and prevents the can from dropping out of the runway. This finger 64 is adjustably mounted on a member 79. Said finger is provided with slots through which bolts 80 pass for securing it in adjusted positions. The member 79 is pivoted at 81 to a bracket 82 extending about the lower end of the runway 17. A spring 86 is secured at one end to the member 79 and at its other end to an arm 90 and normally tends to pull downwardly on the upper end of the member 79. On the shaft 84 is a rotating depresser wheel 18. This rotating depresser wheel 18 is provided with a series of pins 85, and these pins 85 are adapted to engage the curved end 83 of the member 79 and lift the same so as to move the finger 64 upwardly a sufficient distance so as to release the lowermost can in the runway 17. As soon as this lowermost can is released, the weight of the cans in the runway will push it forward until said can engages the arms 63. The can rests then at its upper portion against the arms 63, while at its lower end it rests on the bracket 62, but is pushed forward on the bracket a sufficient distance so that the horn 15 will enter the open end of the can and carry the can forward.

Each arm 63 is adjustably mounted on a shaft 65. The shafts 65 are journaled in brackets 97, 97, respectively, bolted to the frame of the machine. Each arm is secured to its shaft by means of a clamping bolt 92. At the lower end of each shaft 65 there is an arm 66, and each arm carries a roller 67. These rollers lie in the path of travel of the horns 15, so that the horns will engage the rollers, swing the arms away from each other, and this will oscillate the shafts 65 so as to move the arms 63 away from each other, and this releases the can so that it may move forward with the horn. The arms 63 not only engage the upper portion of the can so as to prevent the cans from falling out of the runway, but they also serve to hold the can so that it will be moved to a vertical position by the forward movement of the horn, and thus brought directly over the horn so that the cans move down on to the horns by gravity. Intermediate the ends of each shaft 65 there is a sleeve 69. A spring 76 is connected to this sleeve by a bolt 78. The other end of the spring 76 is connected to a pin 77. This spring normally tends to rotate the shaft 65 so as to position the arm 63 to catch the can when released from the runway. The movement of the arms by the spring 76 is limited by means of a toe 70 on the sleeve 69 engaging an abutment 71. This abutment 71 is adjustably mounted in the bracket 97. A bolt 72 is threaded into the end of the abutment and said bolt also extends loosely through the upwardly projecting part 73 of the bracket 97. A collar 74 on the bolt is adapted to prevent said bolt from endwise movement in the member 73, and a nut 75 is threaded on to the upper portion of this bolt so as to lock it from turning. The extreme outer end of the bolt is provided with a square head 98 by which it can be readily turned. When the nut is loosened and the bolt is turned, it will shift the abutment endwise in the bracket 97. The pin 77 is carried by this abutment 71.

It will readily be seen that when the abutment is shifted, the normal position of the arms 63 will be slightly varied, and this materially aids in the positioning of the arms so as to properly hold the can when released by the finger 64 for the horn to enter into the open end of the can.

The shaft 84 carrying the depresser wheel is mounted in brackets 87, 87 carried by the frame of the machine. This shaft extends outwardly beyond one of said brackets and carries a bevel gear wheel 88 which meshes with a bevel gear wheel 89 carried by a shaft 90. The shaft 90 is turn carries a bevel gear wheel 91 meshing with a bevel gear wheel 92 on a stub shaft which carries a sprocket wheel 93. A sprocket chain 94 runs over said sprocket wheel 93 and also runs over a sprocket wheel 95 on a shaft 96. The shaft 96 carries a gear wheel which meshes with the sprocket wheel 95 and thus it is that this sprocket chain is driven.

From the above it will be apparent that as the traveling trucks pass underneath the runway, a can will be released so as to drop over the horn on the truck. The depresser wheel will engage a can and force it down on to the horn. Meanwhile, the trucks have moved up on to the tracks 48 and make an airtight connection therewith. The valve 36 is open, and the pressing of the can down on to the horn will move the sleeve 32 downwardly and thus cause the vacuum creating ports to connect the interior of the can with the vacuum tank on the frame. The can is thus placed under vacuum and before the can leaves the vacuum creating region, the valve 36 is closed, thus cutting off air from the atmosphere entering the can. As the trucks continue their travel, they pass around the end of the machine and return on the lower horizontal level. If there is a slow leak in a can, the vacuum will be decreased or destroyed to such a point that as soon as the truck is inverted, or soon after, the can which was supported solely by the vacuum will drop from the horn into the runway 17 and pass out as a leak. If, however, the can does not leak, the vacuum will continue to support it until the valve is opened by means of the cam roller 62 engaging the lever 43. This releases the can and it drops into the runway 20 and passes out into a line of perfect cans.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A can testing machine comprising continuously traveling supports for the cans to be tested, elastic means carried thereby for closing the open end of the can, means for placing the can under vacuum while held against the support, means for cutting off the vacuum creating means from the can and for closing the can to the atmosphere, means whereby the can is removed from the support if the vacuum is decreased by a leak so as to release the can from its suction hold on the support and means associated with each traveling support for normally cutting off the connection of the vacuum creating means with said support until a can is placed on the support.

2. A can testing machine comprising continuously traveling supports for the cans to be tested, a horn carried by each support and extending into the can for reducing the area of the can to be placed under vacuum, elastic means carried thereby for closing the open end of the can, means for placing the can under vacuum while held against the support, means for cutting off the vacuum creating means from the can and for closing the can to the atmosphere, means whereby the can is removed from the support if the vacuum is decreased by a leak so as to release the can from its suction hold on the support and means associated with each traveling support for normally cutting off the connection of the vacuum creating means with said support until a can is placed on the support.

3. A can testing machine comprising traveling supports for the cans to be tested, elastic means carried thereby for closing the open end of the can, means for placing the can under vacuum while held against the support, means for cutting off the vacuum creating means from the can and for closing the can to the atmosphere, means for inverting the supports whereby the can will drop therefrom if the vacuum is decreased by a leak so as to release the can from its suction hold on the support and means associated with each traveling support for normally cutting off the connection of the vacuum creating means with said support until a can is placed on the support.

4. A can testing machine comprising traveling supports for the can to be tested, a horn carried by each support and extending into the can for reducing the area of the can to be placed under vacuum, elastic means carried by the support for closing the open end of the can, means for placing the can under vacuum while held against the elastic means, means for cutting off the vacuum creating means from the can and for closing the can to the atmosphere, means for inverting the supports whereby the can will drop therefrom if the vacuum is decreased by a leak so as to release the can from its suction hold on the support and means associated with each traveling support for normally cutting off the connection of the vacuum creating means with said support until a can is placed on the support.

5. A can testing machine comprising an endless series of supports, means for moving said supports continuously in a vertical plane, said supports being so positioned that during their path of travel they are inverted, each support having elastic means for closing the open end of a can, means for placing the can under vacuum while held against the supports, means for cutting off the vacuum creating means from the can and for closing the can to the atmosphere before the support is inverted and means associated with each traveling support for normally cutting off the connection of the vacuum creating means with said support until a can is placed on the support.

6. A can testing machine comprising an endless series of supports, means for moving said supports continuously in a vertical plane, said supports being so positioned that during their path of travel they are inverted, a horn carried by each support over which the can is to be placed, an elastic pad at the base of the support for closing the open end of the can, means for placing the cans under vacuum while they are traveling, means for cutting off the vacuum creating means and closing the cans to the atmosphere before the supports are inverted and means associated with each traveling support for normally cutting off the connection of the vacuum creating means with said support until a can is placed on the support.

7. A can testing machine comprising an endless series of supports, means for moving said supports continuously in a vertical plane, said supports being so positioned that during their path of travel they are inverted, a horn carried by each support over which the can to be tested is placed, means for feeding the cans, one at a time, onto said horns, an elastic support at the bottom of the horn for closing the open end of the can, means for placing the cans under vacuum while held against the supports, and means for cutting off the vacuum and closing the cans to the atmosphere before the supports are inverted.

8. A can testing machine comprising an endless series of supports, means for moving said supports continuously in a vertical plane, said supports being so positioned that during their path of travel they are inverted, a horn carried by each support, an elastic pad at the base of the support for closing the open end of a can placed over the horn, means for pressing the cans down on to said elastic pad, means for placing the cans under vacuum while the supports are traveling, and means for cutting off the vacuum and closing the cans to the atmosphere prior to the inverting of the supports.

9. A can testing machine comprising an endless series of supports, means for moving said supports continuously in a vertical plane, said supports being so positioned that during their path of travel they are inverted, a horn carried by each support, an elastic pad at the base of the support for closing the open end of a can placed over the horn, means for pressing the cans down on to said elastic pad, means for placing the cans under vacuum while the supports are traveling, means for cutting off the vacuum and closing the cans to the atmosphere prior to the inverting of the supports, and means for feeding the cans one at a time on to the horns.

10. A can testing machine comprising an endless series of traveling supports, a horn carried by each support over which a can to be tested is placed, an elastic pad at the base of the horn for closing the open end of the can, ports formed in said traveling supports adapted to be connected with the vacuum creating means while the supports are passing through a portion of their travel, said horn having a port connected with the port in the support and leading to the can, yielding means carried by the horn for closing the port therein, said yielding means projecting above the horn whereby the placing of the can on the horn will operate said yielding means to open the port, means for pressing the cans down on to the horns and the elastic pad at the base of the horn, a valve for closing the port in the support, means for operating said valve, to close the port before the support leaves the vacuum creating means, and means for operating said valve to open said port to release the can after it has been properly tested.

11. A can testing machine comprising an endless series of traveling supports, a horn carried by each support over which a can to be tested is placed, an elastic pad at the base of the horn for closing the open end of the can, ports formed in said traveling supports adapted to be connected with the vacuum creating means while the supports are passing through a portion of their travel, said horn having a port connected with the port in the support and leading to the can, yielding means carried by the horn for closing the port therein, said yielding means projecting above the horn whereby the placing of the can on the horn will operate said yielding means to open the port, means for pressing the cans down on to the horns and the elastic pad at the base of the horn, a valve for closing the port in the support, means for operating said valve, to close the port before the support leaves the vacuum creating means, means for operating said valve to open said port to release the can after it has been properly tested, and means for feeding the cans one at a time on to said horns.

12. A can testing machine comprising a series of traveling supports, a horn on each support, means associated with the supports for putting the cans under vacuum and for cutting off the vacuum creating means and closing the cans to the atmosphere while the supports are traveling, and means for feeding the cans, one at a time, on to said horns, including a runway, a swinging finger operated to release the cans, one at a time, so that said cans will drop into the path of travel of the horns, arms for receiving the cans and causing the same to take an upright position over the horns, and means actuated by the traveling horns for swinging the arms out of the way to permit the can and horn to pass.

13. A can testing machine comprising a series of traveling supports, a horn carried by each support, an elastic pad at the base of each horn for closing the open end of a can placed over the horn for testing, a presser wheel for engaging the cans one after another for forcing the same down into contact with the elastic pad, means associated with the supports for placing the cans under vacuum and for cutting off the vacuum creating means and closing the cans to the atmosphere while the supports are traveling, and means for placing the cans one at a time over the horns comprising a runway, a finger for holding the cans in the runway, means actuated by the rotating presser wheel for moving the finger to release one can at a time, said runway being positioned so that a can when released will drop forward so that the traveling horn will move into the open end of the can and carry the can forward so that it will drop on to the horn.

14. A can testing machine comprising a series of traveling supports, a horn carried by each support, an elastic pad at the base of each horn for closing the open end of a can placed over the horn for testing, a presser wheel for engaging the cans one after another for forcing the same down into contact with the elastic pad, means associated with the supports for placing the cans under vacuum and for cutting off the vacuum creating means and closing the cans to the atmosphere while the supports are traveling, means for placing the cans one at a time over the horns comprising a runway, a finger for holding the cans in the runway, means actuated by the rotating presser wheel for moving the finger to release one can at a time, said runway being positioned so that a can when released will drop forward so that the traveling horn will move into the open end of the can and carry the can forward so that it will drop on to the horn, arms associated with the runway for engaging the upper portion of the can and moving the same to upright position so that they will drop on to the horn, and means actuated by the traveling supports for swinging the arms to allow the horn and can to pass between the same.

15. A can testing machine including in combination, a series of can supports pivoted together to form an endless conveyor, means for supporting said endless conveyor whereby the supports are caused to travel along an upper and a lower horizontal level, and for inverting the supports as they pass from one level to the other, a horn carried by each support, an elastic pad at the base of the horn for closing the open end of a can placed on the horn for testing, rollers on which the supports are mounted, tracks on which the rollers run, a vacuum creating region covering a portion of the travel of the support, means for raising the rollers from the tracks while the supports are passing through the vacuum creating region, said means having a sliding connection on the support, each support having a chamber extending part way along its length, and a port leading therefrom and through the horn to the can, ports leading from the vacuum creating region to the surface on which the supports slide, whereby each support as it passes from the vacuum creating region will be connected thereto, means carried by the horn for closing the port if there is no can on the horn, and means carried by the support for closing the port therethrough before the can leaves the vacuum creating region and again releasing said port before the support reaches the vacuum creating region for testing another can.

16. A can testing machine including in combination, a series of can supports pivoted together to form an endless conveyor, means for supporting said endless conveyor whereby the supports are caused to travel along an upper and a lower horizontal level, and for inverting the supports as they pass from one level to the other, a horn carried by each support, an elastic pad at the base of the horn for closing the open end of a can placed on the horn for testing, rollers on which the supports are mounted, tracks on which the rollers run, a vacuum creating region covering a portion of the travel of the support, means for raising the rollers from the tracks while the supports are passing through the vacuum creating region, said means having a sliding connection with the support, each support having a chamber extending part way along its length, and a port leading therefrom and through the horn to the can, ports leading from the vacuum creating region to the surface on which the supports slide, whereby each support as it passes from the vacuum creating region will be connected thereto, means carried by the horn for closing the port if there is no can on the horn, means carried by the support for closing the port therethrough before the can leaves the vacuum creating region and again releasing said port before the support reaches the vacuum creating region for testing another can, and spring means for forcing the supports down on to the supporting means therefor as it passes from the vacuum creating region.

In testimony whereof, I affix my signature.

ALFRED L. KRONQUEST.